No. 674,263. Patented May 14, 1901.
G. R. ELLIOTT.
ROTARY VALVE.
(Application filed Aug. 28, 1900.)
(No Model.) 2 Sheets—Sheet 2.

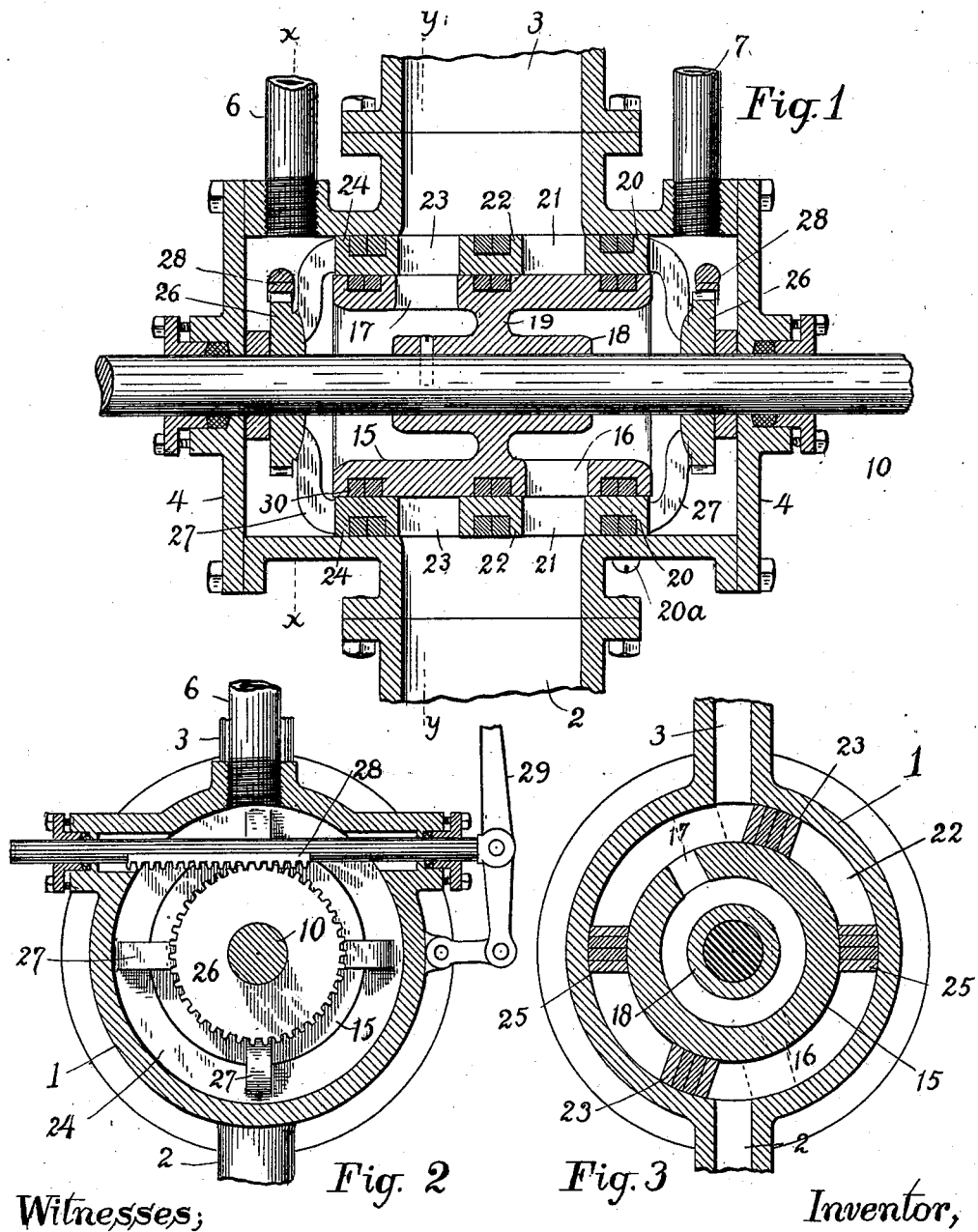

Witnesses;
M. A. Hinds.
R. E. Sawyer

Inventor,
Gilbert R. Elliott,
By A. B. Upham,
His Attorney.

THE NORRIS PETERS CO., PHOTO-LITHO., WASHINGTON, D. C.

UNITED STATES PATENT OFFICE.

GILBERT R. ELLIOTT, OF BOSTON, MASSACHUSETTS.

ROTARY VALVE.

SPECIFICATION forming part of Letters Patent No. 674,263, dated May 14, 1901.

Application filed August 28, 1900. Serial No. 28,353. (No model.)

*To all whom it may concern:*

Be it known that I, GILBERT R. ELLIOTT, a subject of the Queen of Great Britain, and a resident of Boston, in the county of Suffolk and State of Massachusetts, have invented certain new and useful Improvements in Rotary Valves, of which the following is a full, clear, and exact description.

The object of this invention is the construction of means whereby a rotary valve can have its points of cut-off made instantly adjustable and the quantity of steam or other elastic fluid under pressure be made thereby to suit the demand.

My valve is primarily designed for reciprocating steam-engines; but it can equally well be applied to engines driven by compressed air and other gases.

My invention relates also to means for packing this valve against leakage, to the especial devices for rendering the valve adjustable, and to other details of construction.

Figure 4:
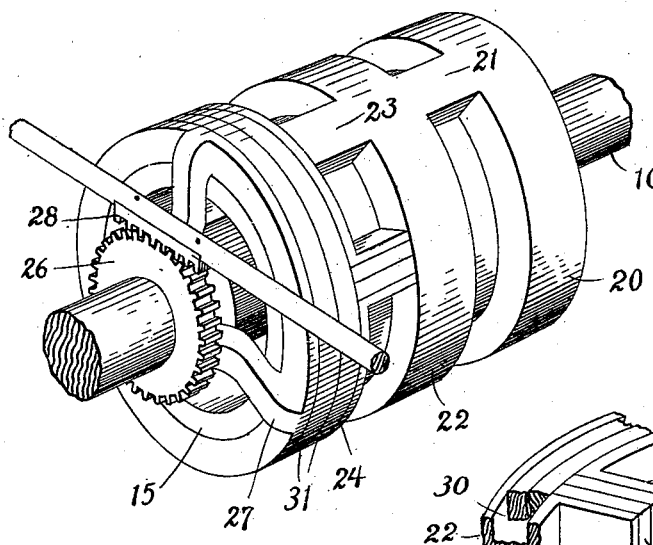
Figure 5:
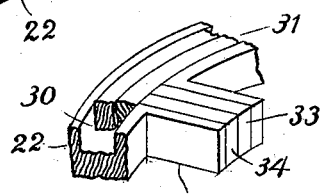
Figure 8:
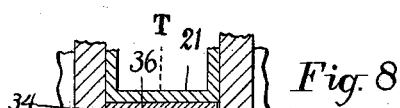
Figure 9:
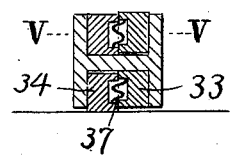
Figure 6:
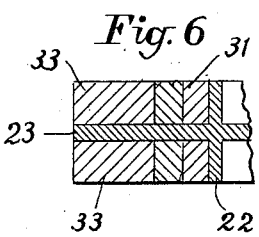
Figure 7:
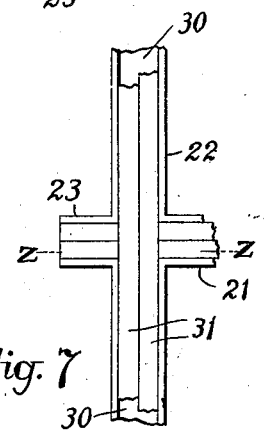

Referring to the drawings forming part of this specification, Figure 1 is a central longitudinal section of my complete valve. Fig. 2 is a transverse section thereof on the line X X in Fig. 1. Fig. 3 is a transverse section on the line Y Y in Fig. 1. Fig. 4 is a perspective view of the inner portion of the valve. Fig. 5 is a perspective view of a part of the adjusting device, illustrating the means for packing the same. Fig. 6 is a cross-section of a modified form of the packing means on the line Z Z in Fig. 7. Fig. 7 is a face view of a part of a ring and its packing means. Fig. 8 is a detail sectional view on the line V V in Fig. 9. Fig. 9 is a cross-section on the line T T in Fig. 8.

Referring to Fig. 1, the reference character 10 indicates a shaft designed to be rotated in unison with the engine to which this valve admits steam. This shaft turns in suitably-packed bearings in the heads 4 of the cylindrical case 1, and within said case is a hollow drum or main inlet-valve 15, rigidly secured upon said shaft by means of the hub 18, joined thereto by a solid radial web 19. Fitting between said drum or main inlet-valve and the interior of said case is the cut-off valve, which consists of the three rings 20, 22, and 24, which are separated from each other by means of the blocks 21, 23, and 25, as shown in Figs. 1, 3, and 4. The blocks 21 23 may be formed integral with the rings 20 22; but if not integral they must be rigidly secured together. So, also, the blocks 25 must be rigidly joined to the ring 24 and the lengths of the blocks 23 be exactly equal to the lengths of the blocks 25 in order that their ends shall equally touch the faces of the rings 22 and 24, as shown in Fig. 4. Through the drum or main inlet-valve 15 at points both diametrically opposite and upon opposite sides of the web 19 are ports 16 17, as shown in Fig. 1, and as the drum rotates said ports come alternately into communication with the steam-inlet pipe 3 and steam-exhaust pipe 2. The tubes 6 and 7 being connected with respectively opposite ends of the engine-cylinder, the latter are hence alternately supplied with live steam and permitted to exhaust through said ports.

In case the valve is to be used in connection with an engine which does not need to be reversed the rings 20 22 and their blocks 21 23 are fixed to the case, as by bolts 20$^a$ in Fig. 1; but where the engine is to be used for propulsion, as in yachts, automobiles, or locomotives, the valve must be capable of reversal. To do this, I have said rings or cut-off valve freely movable and provide the ring 20 with a spur-gear 26, rigidly joined thereto by radial arms 27, said gear meshing with a longitudinally-movable rack-bar 28, terminally extended as a smooth bar, passing through suitable packed bearings to the exterior of the valve-case, where it is provided with a lever 29 or other means for its reciprocation. By suitably moving said lever, and hence the rack-bar 28, the gear and the rings are shifted until the blocks 23 are carried to the opposite sides of the pipe-openings 3 and 2, as shown by the dotted lines in Fig. 3, thus reversing the engine.

To accomplish the main feature of my invention and adapt the valve for a variable cut-off, I provide the ring 24 with a similar arrangement of gear, rack-bar, and lever, and thereby enable said ring to be shifted and its blocks 25 to be moved nearer to or farther from the pipe-openings 2 and 3, for, as is evident upon an inspection of Fig. 3, the nearer the said blocks are to said openings the less opportunity there is for steam to pass from the pipe 3 through the ports in the main inlet-valve. In case the blocks 25 are moved away from the said openings until they touch the blocks 23 there is opportunity for the steam to pass through a port while the main inlet-valve is turning through an arc of nearly, if not fully, one hundred and sixty degrees, while an adjustment in the opposite direction lessens the steam admission until, if desired, none can enter except when a port passes the narrowest possible slit between the blocks 23 25. The object of the rings being to prevent the passage of steam except as arranged for through the ports 16 17, it is essential that there be no leakage between said rings and the main inlet-valve nor between the rings and interior of the case. I do this by means of the packing-rings and packing-blocks hereinafter described.

In the peripheral face of the main inlet-valve 15 are turned three annular grooves 30, adapted to come directly beneath said rings, and in said grooves are fitted the packing-rings 31, of the usual pattern, as indicated in Fig. 1. In the outer face of the ring 24 is turned a similar annular groove fitted with similar packing-rings, while if the valve is designed for a reversing-engine, and hence the rings 20 22 are not to be fixed to the inner wall of the case, the said rings 20 22 are also supplied with packing-rings in the same manner. To prevent the passage of steam between the blocks and the surfaces contacting therewith, I recess said blocks either upon opposite faces, as shown in Fig. 6, or by an opening entirely through the same, as in Fig. 5, and place within each recess a pair of oppositely-pressed packing-strips 33 34, formed with cavities 35, within which are placed springs for suitably pressing said strips. Fig. 8 shows each pair of said strips provided with a spring 36, adapted for giving them an opposite longitudinal pressure, while Fig. 9 shows them provided with springs 37 for giving them opposite transverse pressure. By means of such pressures the end of one strip is retained in constant touch with one surface, the opposite end of the other strip with another surface, and the other edges of said strips are similarly pressed against opposite surfaces, thus insuring a packing contact at every point.

When I speak of the blocks having grooves in both faces, I include in such expression either the construction illustrated in Figs. 6 and 9, where these grooves are separated by a part of the block, or the construction shown in Fig. 5, where the said grooves are united into a single opening.

It is evident that the rings 20, 22, and 24 are the walls of two grooves closed at diametrically opposite points by the blocks 21, 23, and 25.

What I claim as my invention, and for which I desire Letters Patent, is as follows, to wit:

1. In a valve, the combination with a case having the diametrically opposite openings, and the inlets and outlets at opposite ends thereof, the inner face of said case being cylindrical and having two annular grooves; of a cylindrical main inlet-valve revoluble in contact with said face and having diametrically opposite ports each opening into one of said grooves and freely communicating with one end of said case; each of said grooves being permanently closed at diametrically opposite points; two blocks closing one of said grooves but movable therein; and means for adjusting the positions of said blocks in said groove; said grooves and blocks composing a variable-cut-off valve, substantially as described.

2. In a valve, the combination with a case having the diametrically opposite openings, and the inlet and outlet at opposite ends thereof; of a revoluble main inlet-valve having diametrically opposite ports each freely communicating with one end of the case; and a variable-cut-off valve comprising a ring fitting between said main inlet-valve and the inner face of the case, two diametrically opposite blocks fixed to said ring, means for angularly adjusting said ring and its blocks, and two rings forming with the first-named ring, and each other, two grooves one receiving said blocks and each groove closed at diametrically opposite points, substantially as described.

3. In a valve, the combination with a case having the inlets and outlets; of the revoluble drum or main inlet-valve having the ports; the two rings rigidly secured together by the diametrically opposite interposed blocks, said rings fitting between said drum and case and having means for their angular adjustment; and the single ring fitting between said drum and case and having two diagonally opposite blocks projecting therefrom into contact with the nearer of said two rings, and the latter having two similar blocks projecting into contact with said single ring; said single ring having means for its angular adjustment, said rings and blocks comprising a cut-off valve, substantially as described.

4. In a valve, the combination of the case having the inlets and outlets; the main inlet-valve comprising the revoluble drum having the ports; and the cut-off valve comprising the two rings and four blocks rigidly secured together, said rings and blocks fitting between said drum and case; the single ring fitting between said drum and case and having the two blocks rigidly projecting therefrom into contact with one of said two rings; and means for angularly adjusting said rings, said means comprising in each case a spur-gear rigidly connected with a ring, a rack meshing with said gear, a bar holding said rack and extending through to the exterior of the case, and means for longitudinally adjusting said bar, substantially as described.

5. In a valve, the combination of the case having the inlets and outlets; the shaft revoluble in bearings at the ends of said case; the main inlet-valve comprising the drum having the hub fixed upon said shaft and the central web uniting the drum and hub, said drum having the ports; and the cut-off valve comprising the two rings and the blocks rigidly united and fitting between said drum and case; the single ring having the two blocks and fitting between said drum and case; and means for the angular adjustment of said single ring, substantially as described.

6. In a valve, the combination of the case having the inlets and outlets; the revoluble shaft; the main inlet-valve fixed on said shaft and having the ports and annular grooves; the packing-rings in said grooves; the cut-off valve comprising the rings and blocks fitting between said drum and case, said rings having annular grooves in their outer faces, and said blocks, grooves in both faces; packing-rings in said annular grooves, and packing-strips in said grooves in said blocks; and means for angularly adjusting said rings, substantially as described.

7. In a valve, the combination of the case having the inlets and outlets; the revoluble shaft; the main inlet-valve fixed on said shaft and having the ports; and the cut-off valve comprising the rings and blocks between said drum and case, and means for packing said blocks, such means consisting in the two internally-recessed strips fitted in openings in each block, and the springs for giving said strips pressure in opposite directions, substantially as described.

In testimony that I claim the foregoing invention I have hereunto set my hand this 23d day of August, 1900.

GILBERT R. ELLIOTT.

Witnesses:
A. B. UPHAM,
EDWIN SHIVELL.